US006968808B2

(12) United States Patent  (10) Patent No.: US 6,968,808 B2
Claire  (45) Date of Patent: Nov. 29, 2005

(54) MULTI-TEXTURED PET WASHING GLOVE

(76) Inventor: Rory Claire, P.O. Box 661, Pebble Beach, CA (US) 93953

( * ) Notice: Subject to any disclaimer, the term of this patent is extended or adjusted under 35 U.S.C. 154(b) by 0 days.

(21) Appl. No.: 10/655,813

(22) Filed: Sep. 4, 2003

(65) Prior Publication Data

US 2005/0072374 A1  Apr. 7, 2005

(51) Int. Cl.[7] .................. A01K 29/00; A41D 19/00
(52) U.S. Cl. ................................. 119/652; 2/158
(58) Field of Search ................. 119/602, 618, 620, 119/625, 632, 652, 664; D30/158, 159; 2/158, 2/159, 160, 161.6, 161.7; 15/277, 208

(56) References Cited

U.S. PATENT DOCUMENTS

| 1,766,365 | A |   | 6/1930  | Weiss et al. |
|-----------|---|---|---------|--------------|
| 2,265,329 | A | * | 12/1941 | Wachs ............................. 2/158 |
| 2,745,128 | A | * | 5/1956  | Zeuner ............................ 2/158 |
| 4,893,955 | A |   | 1/1990  | Zielinski |
| 5,169,251 | A |   | 12/1992 | Davis |
| 5,373,601 | A |   | 12/1994 | Miller |
| 5,682,837 | A | * | 11/1997 | Courtney et al. ........... 119/625 |
| 5,722,349 | A |   | 3/1998  | Wolgamuth |
| 5,867,829 | A | * | 2/1999  | Hegoas et al. .................. 2/159 |
| D422,758  | S | * | 4/2000  | Roche ....................... D30/158 |
| 6,109,214 | A |   | 8/2000  | Rampersad |
| 6,206,596 | B1|   | 3/2001  | Johnson |
| 6,264,391 | B1| * | 7/2001  | Kroha ......................... 401/201 |
| 6,292,948 | B1| * | 9/2001  | Chen ............................. 2/158 |
| 6,393,614 | B1| * | 5/2002  | Eichelbaum ................... 2/160 |
| 6,460,190 | B1| * | 10/2002 | Blum ............................. 2/158 |
| 6,510,816 | B2| * | 1/2003  | Ehrmann .................... 119/625 |
| 2003/0014824 | A1 | * | 1/2003 | Farmer ....................... 15/227 |
| 2003/0097725 | A1 | * | 5/2003 | Smith ......................... 15/208 |

* cited by examiner

Primary Examiner—Michael J. Carone
Assistant Examiner—Elizabeth Shaw
(74) Attorney, Agent, or Firm—Graybeal Jackson Haley LLP

(57) ABSTRACT

A pet-washing glove including a flexible first side having a first scrubbing texture and a flexible second side having a second scrubbing texture, the sides associated in a manner providing a sheath for a hand and generally defining a first palm portion on the first side, a second palm portion on the second side, a thumb portion, and at least one finger portion. The glove also includes a palmar receptacle that receives and retains a washing material, and releases a solution of the washing material. The glove may conform to both hands of a wearer, accommodating use on one hand with the first scrubbing texture proximate to the palm side of the wearer's hand and use on the other hand with the second scrubbing texture proximate to the palm side of wearer's other hand. A scrubbing texture may be provided by a nap or by a plurality of loops.

26 Claims, 3 Drawing Sheets

MULTI-TEXTURED PET WASHING GLOVE

FIELD OF THE INVENTION

The present invention relates to a hand-worn device for washing a pet, and in particular to a glove particularly adapted to washing pets having different coat thicknesses.

BACKGROUND

Washing a pet such as a dog or a horse generally involves water, soap, shampoo, a scrubbing device such as a washcloth, brush or sponge, and a squirming animal. A person washing the pet usually needs one hand to restrain the pet to prevent it from shaking water, soap, or shampoo off its coat. This leaves only the other hand available for handling a water hose, applying soap and shampoo, and scrubbing the pet. For example, as soon as shampoo is applied to a wet dog, the dog will try to shake off the shampoo before the person has a chance to put the shampoo bottle down, grab a brush, and lather the dog with the non-restraining hand. It seems that generally that the larger the dog, the more they must be restrained from shaking. In addition, the non-restraining hand holds the washcloth, brush, or sponge used to scrub the pet while the other hand remains relatively passive restraining the pet and unavailable to assist scrubbing.

Another aspect of washing a pet involves controlling where the soap and shampoo are applied. For example, soap and shampoo should not be allowed in the pet's eyes and ears. A washcloth, brush, and sponge otherwise suitable for scrubbing the pet do not provide adequate control of the scrubbing process in the vicinity of the eyes and ears. The person's fingers are better suited for the task, requiring putting down the scrubbing device while restraining the pet with the other hand, using their fingers, and then picking up the scrubbing device up for continued use.

A further aspect of washing a pet involves having a brush, sponge, or other scrubbing device readily available with a washing texture appropriate for the pet's hair or fur length and stiffness. For example, a light-haired or short-haired coated dog, such as a Doberman, is best washed and shampooed with a scrubbing device having a washing texture provided by relatively short-nap or brush bristles. A heavy-haired or long-haired coated dog, such as a Saint Bernard, is best washed and shampooed with a scrubbing device having a washing texture provided by relatively long-nap or brush bristles.

Existing hand-worn devices for washing pets do not provide a device that assists in applying soap and shampoo, allows use of both hands to scrub the pet, and provides a variety of washing textures for the differing coats of pets. In view of the foregoing, there is a need in the art for a new and improved hand-worn device for washing pets.

SUMMARY

An embodiment of the present invention provides a pet-washing glove. The pet-washing glove includes a flexible first side having a first scrubbing texture and a flexible second side having a second scrubbing texture, the sides being associated in a manner providing a sheath for a hand and generally defining a first palm portion on the first side, a second palm portion on the second side, a thumb portion, and at least one finger portion. The glove also includes a palmar receptacle that receives and retains a washing material, and releases a solution of the washing material. Each side of the glove may include a palmar receptacle. The glove may conform to both hands of a wearer, accommodating use on one hand with the first scrubbing texture proximate to the palm side of the wearer's hand and use on the other hand with the second scrubbing texture proximate to the palm side of wearer's other hand. A scrubbing texture may be provided by a nap of the material forming at least one side, or by a plurality of loops of a material forming at least one side. The second scrubbing texture may be different than the first scrubbing texture. The palmar receptacle may include definition by a material overlaid on an outer surface of the palm portion. At least a portion of the palmar receptacle may be water permeable, and the palmar receptacle may be refillable. The palmar receptacle may include a configuration that retains at least one of a solid, a gel, a semi-sold, and a liquid-washing material. The palmar receptacle may allow water access to the washing material, and release the washing material from the receptacle when the washing material is wetted.

Another embodiment of the invention also provides a pet-washing glove. The pet-washing glove includes a flexible first side having a first scrubbing texture and a flexible second side having a second scrubbing texture, the sides being associated in a manner providing a sheath for a hand and generally defining a first palm portion on the first side, a second palm portion on the second side, a thumb portion, and at least one finger portion. The glove also includes a washing material impregnated in the first and second sides, and released therefrom upon wetting.

These and various other features as well as advantages of the present invention will be apparent from a reading of the following detailed description and a review of the associated drawings.

BRIEF DESCRIPTION OF THE DRAWINGS

The features of the present invention which are believed to be novel are set forth with particularity in the appended claims. Aspects of the invention, together with further objects and advantages thereof, may best be understood by making reference to the following description taken in conjunction with the accompanying drawings, in the several figures of which like referenced numerals identify like elements, and wherein:

DETAILED DESCRIPTION

In the following detailed description of exemplary embodiments of the invention, reference is made to the accompanying drawings, which form a part hereof. The detailed description and the drawings illustrate specific exemplary embodiments by which the invention may be practiced. These embodiments are described in sufficient detail to enable those skilled in the art to practice the invention. It is understood that other embodiments may be utilized, and other changes may be made, without departing from the spirit or scope of the present invention. The following detailed description is therefore not to be taken in a limiting sense, and the scope of the present invention is defined by the appended claims.

Figure 1:
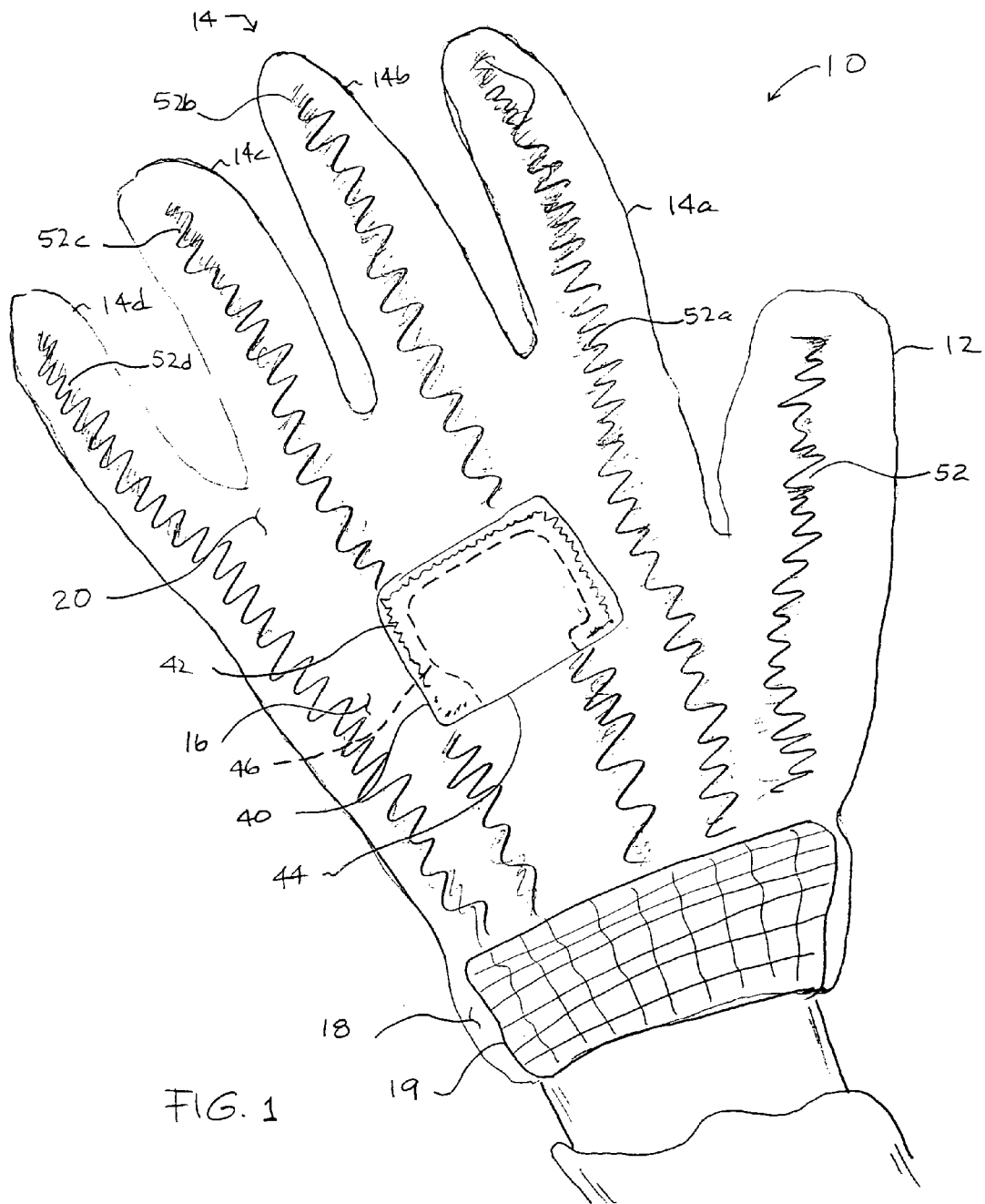
FIG. 1 illustrates a palm view of a first side of a flexible pet-washing glove worn proximate to a palm of a wearer's right hand, according to an embodiment of the invention.
Figure 2:
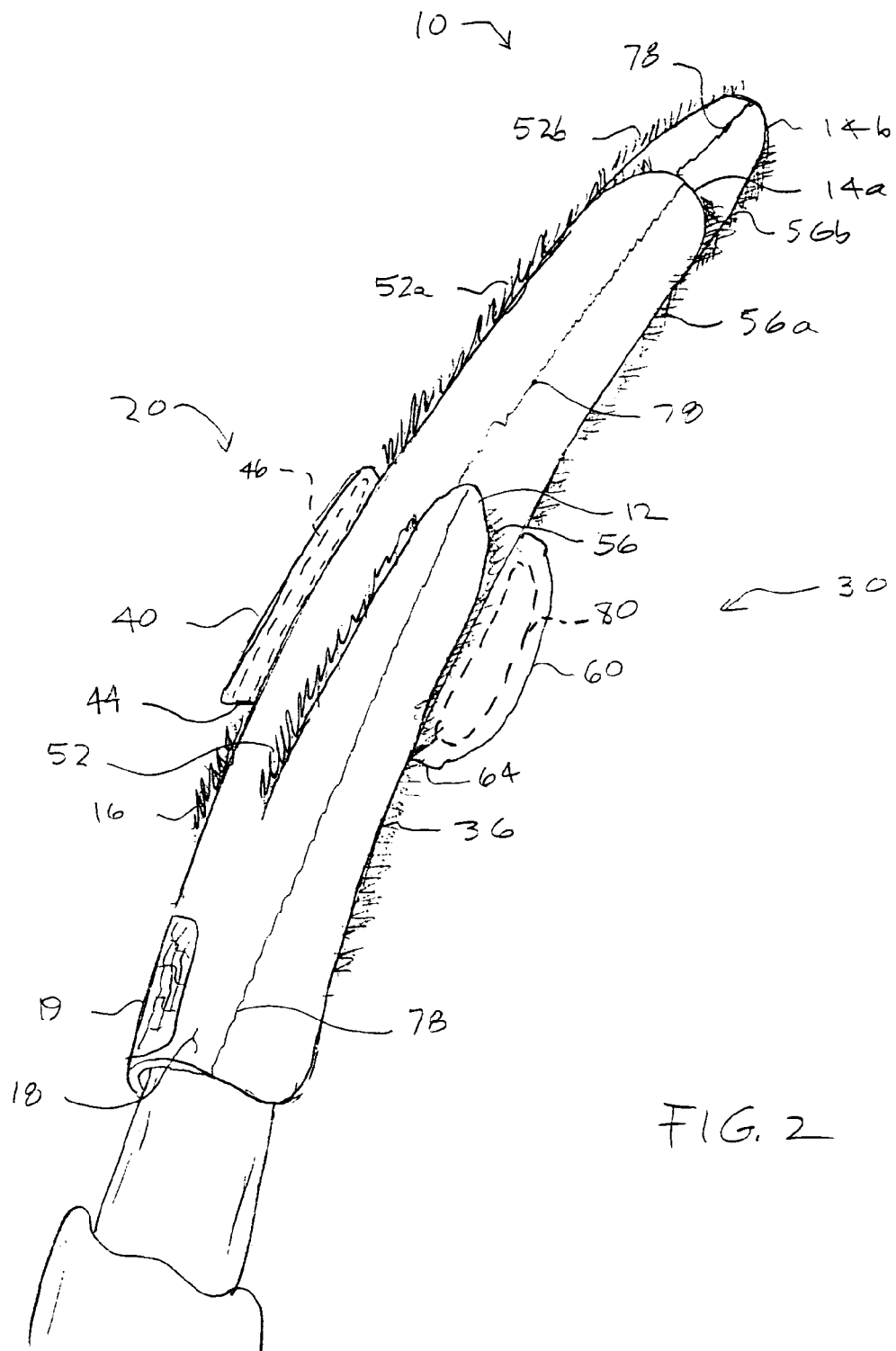
FIG. 2 illustrates a thumb portion side view of the glove of FIG. 1 according to an embodiment of the invention.

FIG. 1 illustrates a palm view of a first side 20 of a flexible pet-washing glove 10 worn proximate to a palm of a wearer's right hand, according to an embodiment of the invention. FIG. 2 illustrates a thumb portion side view of the glove 10 of FIG. 1 according to an embodiment of the invention. The pet-washing glove 10 includes a first side 20 and an opposite second side 30, a thumb portion 12, a finger portion 14 having fingers 14a–14d, a wrist portion 18, and a closure portion 19. The first side 20 includes a first scrubbing texture 52, a first palm portion 16, and a first palmar receptacle 40. The second side 30 includes a second scrubbing texture 56, a second palm portion 36, and a second palmar receptacle 60. The first palmar receptacle 40 includes perimeter stitching 42, opening 44, and receptacle pocket 46 shown in dashed lines. The second palmar receptacle 60 is similar to the first palmar receptacle 40. In FIG. 2, the second palmar receptacle 60 is illustrated carrying washing material 80. The first and second sides are joined at seam 78.

Both the first side 20 and the second side 30 are formed from a flexible sheet material having sufficient strength to carry the first and second scrubbing textures 52 and 56, respectively, and transmit a scrubbing force from a wearer's hand to the pet's coat through a scrubbing texture (52, 56). A synthetic sheet material is preferred, such as 100-percent nylon. Synthetic materials are preferred for their wet strength and tolerance for repeated uses. The sheet material does not need to be waterproof. If protection of the wearer's hands from water is desired, waterproof gloves may be worn under the glove 10, such as commonly available latex gloves. The sheet material is preferably stretchable in at least one direction for improved wearer comfort. The flexible sheet material may have any suitable thickness. In an embodiment, the flexible sheet material includes a configuration allowing a wearer sufficient tactile contact with the pet to perceive irregularities in the pet's coat and skin. Such configuration may be provided with a relatively thin flexible sheet material, or may be provided by a combination of properties such as a relatively thin and a relatively soft flexible sheet material. While the sheet material can be a cloth fabric, a cloth fabric, such as a terry cloth, is a less preferred embodiment because of generally less durability, low wet-strength, less sudsing ability and tolerance for repeated uses.

The first and second sides (20,30) are associated by sewing at the seam 78 to form the glove 10. The glove 10 is configured to conform to both hands of a wearer. For example, when worn on a right hand, the first side 20 of the glove 10 is proximate to the palm of right hand, and when the same glove is worn on a left hand, the second side 30 is proximate to the palm of the left hand. In alternative embodiments, the first and second sides (20,30) can be associated by gluing, or by any other form of bonding known to those skilled in the art. In a further embodiment, the first and second sides (20,30) are portions of a one-piece molded glove.

The first scrubbing texture 52 is associated with the first side 20, and the second scrubbing texture 56 is associated with the second side 30. The scrubbing textures generally constitute portions of the flexible sheet material used to form the sides (20,30), but may constitute another material coupled to the sheet material in any manner known to those in the art. The scrubbing textures (52,56) in an embodiment include fibers arranged on a surface of the flexible sheet material in any manner known in the art that provides a texture that, when moved relative to a pet's coat, rubs the coat enough to clean. In an embodiment illustrated in FIGS. 1 and 2, the scrubbing textures (52,56) include a pattern of longitudinal bands of fibers 52, 52a–52d running across the palm portion (16,32) and along the thumb 12 and fingers 14a–14d to their tips. In another embodiment, the scrubbing textures (52,56) can cover the entire first and second sides (20,30). In a further embodiment, one side can have a pattern of longitudinal bands (52, 52a–52d) as illustrated in FIG. 1, and another side can be completely covered with the scrubbing texture. The scrubbing texture in another embodiment includes loops of the material of the flexible sheet material, such as loops of nylon incorporated into a nylon-base material. The loops may be cut, or intact. In other embodiments, the scrubbing texture is provided by a weaving pattern used to form the sheet material, or by a nap of the material used to form the sheet material. As illustrated, the scrubbing textures (52,56) are included on the portion of the first and second sides (20,30) of the glove 10 that are not proximate to the skin of the wearer's hand.

The first scrubbing texture 52 and second scrubbing texture 56 of the glove 10 are different according to an embodiment of the invention, and are selected for scrubbing pets having different coats, such as Doberman and Saint Bernard breeds. For example, a first washing texture 52 may be selected for washing a Doberman. The selected first washing texture 52 can be 100-percent nylon material having a relatively rough or course weave sufficient to rub a Doberman's coat without causing discomfort or scratching the dog. A second washing texture 56 may be selected for washing a Saint Bernard. The second washing texture 56 can be another 100-percent nylon material having loops between approximately 0.10 and 0.50 inch long, and preferably 0.20 inch long, sufficient to rub the longer and heavier coat of a Saint Bernard.

In a less preferred embodiment, a scrubbing texture (52, 56) is provided by a nap or loops of material of a natural cloth, such as terry cloth or similar fabrics.

The first palmar receptacle 40 typically includes formation by overlying a sheet material over an outer surface of the first palm portion 20. The receptacle is configured for receiving and retaining a washing material 80, such as a soap, conditioner, or shampoo. The washing material can be in liquid, gel, semi-solid, or solid form. The overlying material is attached to the first palm portion 20 by sewing, as illustrated by stitches 42 sewn around less than all of a marginal edge of the receptacle 40, leaving an opening 44 that receives the washing material 80. The overlying material has sufficient structural integrity to retain the washing material 80 once the washing material is received in the receptacle 40 through the opening 44, and sufficient structural integrity to withstand the wearer rubbing it against the pet during washing. The overlying material can also include an elastic property allowing the opening 44 to be expanded for reception of the washing material 80. An aspect of the invention contemplates that water will enter the receptacle pocket 46 through pores in the overlying material, wet a washing material 80 retained therein, create a solution of the washing material, and that the solution will be released from the pocket 46 through the pores of the overlying material and the glove 10. Placing the wearer's gloved hand with the receptacle 40 in proximity to the pet's coat will discharge the solution on the coat. In an embodiment, the overlying material is also a 100-percent nylon material having a porous mesh or woven structure that has the required structural integrity while allowing water and the solution to pass through the overlying material. The overlying material of the first palmar receptacle can also include a scrubbing surface.

The glove 10 is retained on the wearer's hand by any suitable means. In an embodiment, the wrist portion 18, and a closure portion 19 are located proximate to an open end of the glove 10. The closure portion 19 includes an elasticized area configured to draw the wrist portion 18 proximate to and retain the glove 10 on a wrist portion of a wearer's hand. In an alternative embodiment, the closure portion 19 can include a hook-and-pile fastener.

In use, the washing material 80 is loaded through the opening (44, 64 (not shown)) and received into the palmar receptacle pocket (46, 66 (not shown)) of the side of the glove 10 having the scrubbing texture (52, 56) selected for the pet being washed. The glove 10 is placed on a wearer's hand and wetted either by rubbing over a wet coat of the pet or by a water source such as a hose. As a result of the wetting process, water passes through the overlying sheet material of the palmar receptacle pocket (46, 66 (not shown)) and dissolves the washing material into a solution. The wetted glove 10 is rubbed over the pet's coat and the solution of the washing material 80 passes through the overlying sheet material of the palmar receptacle pocket (46, 66 (not shown)) and onto the pet's coat. The selected scrubbing texture (52, 56) of the glove 10 rubs against and washes the pet's coat in cooperation with the solution of the washing material 80. The glove 10 may be sold in a package of two, with each glove being a mirror image of the other. This allows both of wearer's hands to wear a glove 10 having the same scrubbing texture (52, 56) proximate to the palms of their hands, such that both hands could scrub a pet with a selected scrubbing texture. The fingers 14a–14d allow the wearer to carefully scrub the pet's face and avoid getting the washing material 80 into the pet's eyes and ears. The gloves 10 also provide a physical separation between the wearer's hands and the pet's private parts, and any open sores on the pet.

Figure 3:
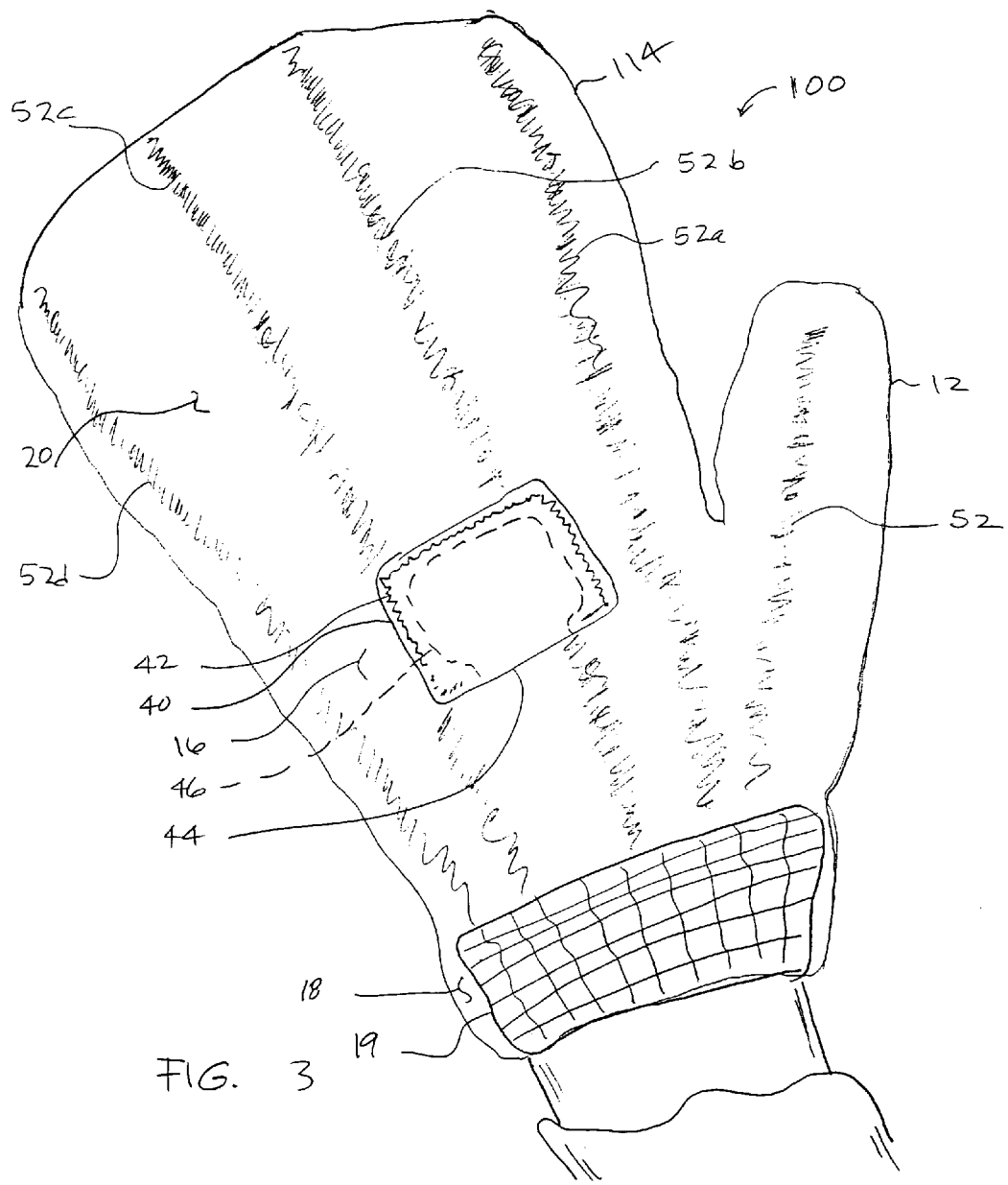
FIG. 3 illustrates a palm view of a first side of a flexible pet-washing mitten worn proximate to a palm of a wearer's right hand, according to an embodiment of the invention.

FIG. 3 illustrates a palm view of a first side 20 of a flexible pet-washing mitten 100 worn proximate to a palm of a wearer's right hand, according to an embodiment of the invention. The mitten 100 is similar to the glove 10 of FIGS. 1 and 2 in that it has scrubbing textures (52,56) and palmar receptacles (40,60); however, the mitten 100 has a single cover 114 for sheathing a wearer's fingers. The mitten 100 may be better suited for washing large animals such as a horse because it allows a larger scrubbing texture area than the glove 10.

In an alternative embodiment that is not illustrated, the pet-washing glove does not include any palmar receptacles 40 and 60 for receiving the washing material 80. Instead, the flexible sheet material used to form the first side 20 and the second side 30 is selected to absorb a washing material 80 before sale to a wearer. The glove, still having the first scrubbing texture 52 and the second scrubbing texture 56, is packaged and sold to the wearer with the washing material 80 absorbed or impregnated into the glove. The wearer can put on one or two gloves, and wash the pet by rubbing a gloved hand with a selected texture (52,56) toward the pet as before. Upon wetting, the impregnated washing mixture 80 of the glove 10 dissolves and is disbursed to the pet's coat as before. The flexible sheet material forming the first side 20 and the second side 30 of the glove can be a porous foam material. An impregnated glove typically would be a single-use or disposable glove.

Although the present invention has been described in considerable detail with reference to certain preferred embodiments, other embodiments are possible. Therefore, the spirit or scope of the appended claims should not be limited to the description of the embodiments contained herein. It is intended that the invention resides in the claims hereinafter appended.

What is claimed is:

1. A pet washing glove, comprising:
   a flexible first side and a flexible second side being associated in a manner providing a sheath for a hand and generally defining a first palm portion on the first side, a second palm portion on the second side, a thumb portion and finger portions, the flexible first side having a first scrubbing texture and the flexible second side having a second scrubbing texture that is different than the first scrubbing texture, each scrubbing texture including longitudinal bands of material running along the length of the thumb and finger portions, and across the palm portion; and
   a palmar receptacle that receives and retains a washing material, and releases a solution of the washing material.

2. The glove of claim 1, wherein each side includes a palmar receptacle.

3. The glove of claim 1, wherein the glove conforms to both hands of a wearer, accommodating use on one hand with the first scrubbing texture proximate to the palm side of the wearer's hand and use on the other hand with the second scrubbing texture proximate to the palm side of wearer's other hand.

4. The glove of claim 1, wherein the glove is flexible.

5. The glove of claim 1, wherein the sides are associated by a mechanical joining.

6. The glove of claim 5, wherein the joining includes stitching.

7. The glove of claim 1, wherein at least one side includes a flexible sheet material.

8. The glove of claim 1, wherein a nap of the material forming at least one side provides at least one scrubbing texture.

9. The glove of claim 1, wherein a plurality of loops of a material forming at least one scrubbing texture.

10. The glove of claim 1, wherein at least one side includes stretchablity in at least one direction.

11. The glove of claim 1, wherein the palmar receptacle includes definition by a material overlaid on an outer surface of the palm portion.

12. The glove of claim 1, wherein the palmar receptacle overlies less than the entire palm surface.

13. The glove of claim 1, wherein the palmar receptacle overlies a central portion of the palm.

14. The glove of claim 1, wherein the palmar receptacle includes a joining about a portion of its marginal edge to a respective palm portion.

15. The glove of claim 1, wherein at least a portion of the palmar receptacle is water permeable.

16. The glove of claim 1, wherein palmar receptacle is refillable.

17. The glove of claim 1, wherein the palmar receptacle includes a configuration that retains at least one of solid, gel, semi-solid, and liquid washing material.

18. The glove of claim 1, wherein the palmar receptacle allows water access to the washing material, and releases the washing material from the receptacle when the washing material is wetted.

19. The glove of claim 1, wherein the palmar receptacle includes a configuration that dispenses the washing material when the glove is rubbed over a wet coat of the pet.

20. The glove of claim 1, wherein the glove provides a separation distance between a hand in glove and the pet.

21. The glove of claim 1, wherein the glove allows tactile perception of the pet by a hand in the glove.

22. The glove of claim 1, wherein when the glove is worn on a hand of the wearer, the first side is proximate to the palm of the hand, and when worn on the other hand of the wearer, the second side is proximate to the palm of the other hand.

23. A single-use pet washing glove, comprising:
a first side and a second side being associated in a manner providing a sheath for a hand and generally defining a first palm portion on the first side, a second palm portion on the second side, a thumb portion, and finger portions, the first side having a scrubbing texture that includes longitudinal bands of material running along the length of the thumb and finger portions, and across the palm portion; and
a washing material impregnated in at least one of the first and second sides, and released therefrom upon wetting.

24. A pet-washing glove, comprising:
a flexible first side and a flexible second side being associated in a manner providing a sheath for a hand and generally defining a first palm portion on the first side, a second palm portion on the second side, a thumb portion, and finger portions, the flexible first side having a first scrubbing texture and the flexible second side having a second scrubbing texture, each scrubbing texture including longitudinal bands of material running along the length of the thumb and finger portions, and across the palm portion; and
a washing material impregnated in at least one of the first and second sides, and released therefrom upon wetting.

25. A pet-washing glove, comprising:
first flexible means including a first scrubbing texture for scrubbing a coat of a pet;
second flexible means joined with the first flexible means in a manner that provides a cover for either hand of a wearer and generally defining a first palm portion on a first side, a second palm portion on a second side, a thumb portion, and finger portions, the second flexible means including a second scrubbing texture that is different than the first scrubbing texture for scrubbing the coat of the pet, the first and second scrubbing textures each include longitudinal bands of material running along the length of the thumb and finger portions, and across the palm portion; and
means in proximity to at least one palm portion for receiving and retaining a washing material, and releasing a solution of the washing material.

26. A pet-washing glove, comprising:
a flexible first side and a flexible second side being associated in a manner providing a sheath for a hand and generally defining a first palm portion on the first side, a second palm portion on the second side, a thumb portion and finger portions, the flexible first side having a first scrubbing texture and the flexible second side having a second scrubbing texture that is different than the first scrubbing texture, each scrubbing texture including longitudinal bands of material running along the length of the thumb and finger portions, and across the palm portion; and
a washing material impregnated in at least one of the first and second sides, and released therefrom upon wetting.

* * * * *